US005518745A

United States Patent [19]
Thota et al.

[11] Patent Number: 5,518,745
[45] Date of Patent: *May 21, 1996

[54] METHOD FOR TWO PHASE CONVEYANCE OF A PRODUCT

[75] Inventors: Hamsa A. P. Thota; Don A. Rebstock, both of St. Simons Island, Ga.; Chandrakant S. Shah, Greenfield, Ind.

[73] Assignee: Rich-SeaPak Corporation, St. Simons Island, Ga.

[*] Notice: The term of this patent shall not extend beyond the expiration date of Pat. No. 5,393,546.

[21] Appl. No.: 356,745

[22] Filed: Dec. 15, 1994

Related U.S. Application Data

[63] Continuation of Ser. No. 23,997, Feb. 26, 1993, Pat. No. 5,393,546.
[51] Int. Cl.$^6$ ................................. A23L 1/00; A23P 1/00
[52] U.S. Cl. ..................... 426/276; 426/512; 426/573
[58] Field of Search .................................. 426/302, 276, 426/573, 512, 513, 514; 425/107

[56] References Cited

U.S. PATENT DOCUMENTS

| | | | |
|---|---|---|---|
| 2,317,687 | 4/1943 | Larchar | 425/107 |
| 3,851,084 | 11/1974 | Rossen et al. | 426/343 |
| 3,885,053 | 5/1975 | Townsend | 426/276 |
| 4,000,256 | 2/1977 | Kyros | 426/102 |
| 4,117,172 | 9/1978 | Bradshaw et al. | 426/276 |
| 4,119,739 | 10/1978 | Barwick et al. | 426/573 |
| 4,280,803 | 7/1981 | Treharne | 425/99 |
| 5,223,297 | 6/1993 | Theys et al. | 426/514 |
| 5,393,546 | 2/1995 | Thota et al. | 426/512 |

FOREIGN PATENT DOCUMENTS

| | | |
|---|---|---|
| 0009897 | 9/1979 | European Pat. Off. . |
| 513904 | 4/1984 | Spain . |
| 1369198 | 11/1970 | United Kingdom . |
| 1474629 | 8/1974 | United Kingdom . |
| 2032242 | 9/1976 | United Kingdom . |

OTHER PUBLICATIONS

Porex Technologies trade literature entitled "Porex Porous Plastics Fabrication Techniques".
"Extruded Seafood", May 1984 Food Processing.
Mondomix trade literature entitled "Continuous Aerting Systems".

Primary Examiner—George Yeung
Attorney, Agent, or Firm—Kenyon & Kenyon

[57] ABSTRACT

The present invention is directed to a method and apparatus for conveying a product. In accordance with the method aspects of the present invention, the steps comprise providing a flow channel having internal surfaces and introducing the product into the channel and causing the product to move through the channel for flow as a first phase through the channel. Pursuant to a feature of the present invention, a step of simultaneously applying a film of fluid over the internal surfaces is carried out during movement of the product through the channel to provide a second phase to surround the first phase and separate the first phase from the internal surfaces during conveyance of the product through the channel so that the first phase moves as a plug of material through the channel.

27 Claims, 4 Drawing Sheets

METHOD FOR TWO PHASE CONVEYANCE OF A PRODUCT

This application is a continuation of application Ser. No. 08/023,997, filed on Feb. 26, 1993, now U.S. Pat. No. 5,393,546.

FIELD OF THE INVENTION

The present invention is directed to a product conveyance method and apparatus, the apparatus being suitable for use as an extrusion die for conveying and forming a product. More specifically, the present invention is directed to a method and apparatus for a two phase product conveyance method and apparatus arranged to reduce shear forces exerted on the product during conveyance.

BACKGROUND OF THE INVENTION

The need to convey a product is frequently encountered during many industrial processes. For example, an extruder is a well known apparatus utilized to provide continuous mixing and conveyance of ingredients of a product. Extruders are widely used in many industries, e.g. the chemical and food processing industries, to continuously mix ingredients of a product and to form the product by conveying the mixed ingredients through a die having a preselected shape. The continuous processing provided by an extruder often results in an efficient and cost effective alternative to batch processing techniques.

Extruders typically include an arrangement of inlet ports for ingress of various ingredients to be mixed by the extruder, into a mixing chamber. The mixed ingredients are forced through the extrusion die by the conveying action of various mechanical elements and onto a conveyor or other processing mechanism for cutting and further processing. The cross-section of the extrusion die is arranged to form the mixed ingredients (referred to as the extrudate), as it is forced through the die, into a desired shape for the product.

Conveyance of a mixture of ingredients through a die often occurs under laminar flow conditions. Product flow under these conditions causes maximum flow velocity at the center of flow, with those portions of the product in contact with surfaces, such as, e.g., extruder die surfaces, tending to adhere to the surfaces due to the friction. In such circumstances, it is typical for the surfaces of the mixed ingredients in contact with the surfaces of the extruder die to encounter friction due to the relative movement of the product over the extruder surfaces. This results in shear forces throughout the product as it is conveyed through the extruder and forced through the extrusion die.

The presence of laminar flow with shear forces can degrade product quality. This is particularly true in shear sensitive products, i.e., products that are susceptible to degradation due to the shear forces. Thus, the advantages of continuous mixing and conveying afforded by extrusion processing can be overcome by product degradation when applied to a shear sensitive product, particularly when the shear sensitive product is of a relatively high viscosity. Moreover, the shear forces can cause physical break up of the product as it is forced through an extrusion die, resulting in degradation of the internal structure and integrity of the product.

In certain ingredient mixing operations, desired chemical reactions occur between the ingredients. Often the chemical reactions affect the rheological properties of the product. For example, a setting solution can be mixed with other liquid ingredients to set the ingredients into a solid or gel state for shaping and forming. Setting reactions are also utilized to reconstitute food products so that solutions, e.g., containing a source ingredient, can be reconstituted into a gel having the texture and consistency of the original food product used to provide the source ingredient.

A problem with utilizing a continuous extrusion process to obtain a set extrudate is that when the product begins to set within the extruder, the possibility of degradation and physical break up of the extrudate during conveyance increases after the transition of the mixed ingredients from a liquid phase to a highly viscous solid or gel phase. The high viscosity of the setting gel increases shear forces throughout the extrudate as it is conveyed through the extruder. When the final mixture of the product is shear sensitive, the extrudate tends to degrade and break apart, at least sporadically, as it is conveyed through the extrusion die, significantly limiting the ability to continuously convey, shape, form and cut the extrudate in an efficient and continuous manner.

Thus, the desirability and efficiency of continuously processing and conveying ingredients undergoing a simultaneous chemical setting reaction becomes problematical, particularly in an extrusion process. The inherent continuous mixing, conveying, forming and shaping aspects of an extrusion operation are rendered ineffective for shear sensitive products, especially those undergoing setting reactions, due to a continuously increasing viscosity and resultant generation of damaging shear forces, as the mixed ingredients transition during conveyance through the extruder, from a liquid phase to a solid phase. Heretofore known systems do not provide a method of product conveyance suitable to reduce shear forces so that, e.g., an extrusion process of the type described above, can be effectively performed.

SUMMARY OF THE INVENTION

The present invention is directed to an improved method and apparatus for conveyance of a product. Generally, the present invention comprises a conveyance channel to receive and convey the product. The conveyance channel is provided with internal surfaces forming flow surfaces for conveyance of the product through the channel. A fluid flow path communicating with the internal surfaces is arranged to continuously apply a film of fluid over the internal surfaces as the product is conveyed through the channel so that the product is conveyed as a first phase within the channel surrounded by the film acting as a second phase to separate the first phase from the internal surfaces.

According to a feature of the present invention, the second phase fluid film comprises a low viscosity fluid to minimize friction between the product being conveyed and the internal surfaces of the conveyance channel. This minimizes the development of shear forces within the product. Indeed a low viscosity second phase film permits the first phase product to flow through the conveyance channel as a plug of material, i.e. a mass of material flowing uniformly in a unitary mass with minimal relative velocity between portions or layers of the first phase.

In an exemplary embodiment of the present invention, the internal surfaces of the conveyance channel comprise a porous material and the fluid flow path surrounds the porous material on a side thereof opposite to the internal surfaces, to cause the fluid to flow through the porous material and form the film on the internal surfaces for two phase flow according to the present invention.

For use in an extrusion process including the continuous extrusion forming of a product undergoing a simultaneous chemical setting reaction, as described above, the present invention comprises a method and apparatus for first continuously mixing and, immediately thereafter, extrusion conveyance and shaping of reactant ingredients. The reactant ingredients are thoroughly mixed by mechanical action in an extruder-type mixer mechanism and simultaneously conveyed to an extrusion die while still in a liquid phase. The extrusion die is arranged so that the length of the zone and the speed of conveyance of the mixed reactant ingredients through the zone permit an adequate amount of time for the mixed reactant ingredients to react chemically with one another and to thereby set in a solid or gel state for extrusion and further processing. Once in the solid or gel state, the reactant ingredients continue flow as a plug due to the minimal shear forces resulting from the effects of the surrounding second phase fluid film. The shape of the extrusion die is configured to the desired shape for the set extrudate so that the solid or gelled product sets in the desired shape as it is continuously moved through the extrusion die.

The film of low viscosity fluid provides a lubrication function by separating the high viscosity, setting ingredients from direct, friction engagement with the extrusion die surfaces. Relatively high friction motion between the solidifying ingredients and the surfaces of the extrusion die is replaced by relatively low friction engagements on either side of the low viscosity film.

In an exemplary embodiment of the present invention, the setting reaction can be delayed until after the reactant ingredients have flowed from the mixer mechanism into the conveyance channel. This can be achieved by setting the dimensions of the conveyance channel so that back pressure within the mixer mechanism is sufficiently high to preclude setting reactions. Once the reactant ingredients are within the conveyance channel, the plug type movement of the reacting ingredients, as the first phase, facilities an efficient and effective setting reaction between reactant ingredients due to the minimal relative motion and shear between layers of the plug resulting from the surrounding low viscosity second phase film.

Thus, the efficiency of continuous extruder conveyance after mixing reactant ingredients that cause gelling, can be utilized due to the two phase conveyance method of the present invention without encountering potentially deleterious effects of degrading shear forces in the product flow after the setting of the product in a solid or gel state.

In one exemplary embodiment of the extrusion feature of the present invention, the surfaces of the extrusion die comprise porous flow surfaces. A system of fluid channels is formed in a housing arranged to mount the extrusion die. A fluid inlet is formed in the housing and a system of reservoirs is arranged within the housing to surround the porous flow surfaces. The fluid channels provide fluid communication between the fluid inlet and the reservoir system.

In this manner, the low viscosity fluid is formed into a uniform film over the ingredient contacting surfaces of the extrusion die by injection of a pressurized flow of the low viscosity fluid into the inlet, which then flows under pressure through the fluid channels and into the reservoir system. The reservoirs are configured so that fluid under pressure within the reservoir system continuously seeps in a generally uniform flow through the porous material and onto the ingredient contacting surfaces of the extrusion die. A continuous injection of the pressurized low viscous fluid is maintained while the setting product moves through the extrusion die to maintain a continuously lubricating film between the die surfaces and the moving product for a two phase flow.

In accordance with another advantageous feature of the present invention, the low viscous fluid comprises a setting solution to improve the setting of the mixed ingredients at the surfaces thereof in contact with the second phase film. Thus, the setting chemical reaction is reinforced at the moving surfaces of the mixed ingredients by the low viscosity fluid as it lubricates the extrusion die surfaces to minimize shear forces in the setting product. Moreover, the chemical reaction between the second phase film and the surfaces of the first phase plug causes the surfaces of the plug to set or gel more quickly than the remaining portions of the plug. The set or gelled plug surfaces act to inhibit the transfer of any surface shear forces that may develop to the interior of the plug, to further minimize the effects of shear forces on the setting of the reactant ingredients within the plug.

DETAILED DESCRIPTION

Figure 1:
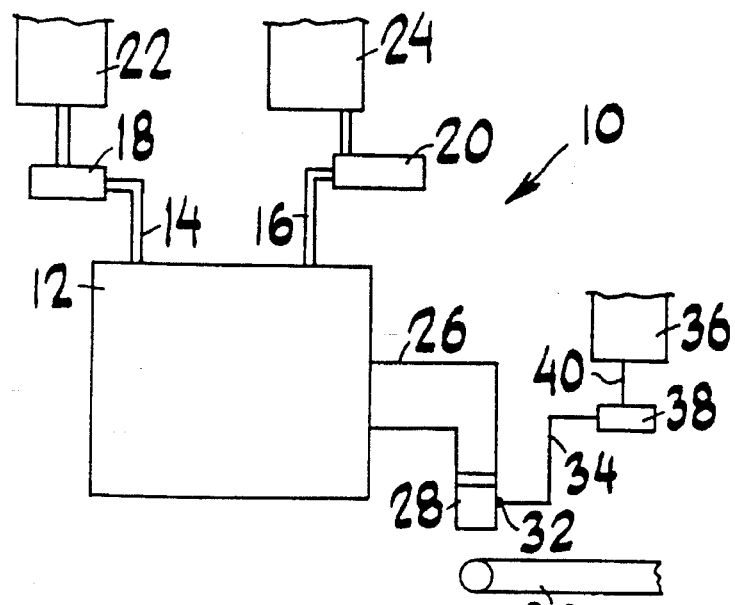
FIG. 1 is a schematic illustration of an extruder system utilizing a two phase flow conveyance according to the present invention.

Referring now to the drawings, and initially to FIG. 1, there is illustrated an extrusion system according to the two phase flow conveyance of the present invention, generally indicated by the reference numeral 10. The system 10 comprises a mixer 12 of e.g., the type manufactured by Mondomix-Holland by of Nederhorst den Berg, the Netherlands. The mixer 12 includes two inlet ports 14, 16, each coupled to a pump 18, 20, respectively. The pump 18 is coupled to a first supply tank 22 and the pump 20 is coupled to a second supply tank 24. In this manner, the pumps 18, 20 are operated simultaneously to inject the contents of the tanks 22, 24 into the respective inlet ports 14, 16 of the mixer 12 for mixing.

In an exemplary embodiment of the present invention, a slurry or solution to be set, shaped and formed is contained in the first supply tank 22 and a setting solution is contained in the second supply tank 24. The operation of the pumps 18, 20 and the mixer 12 causes the solution of the first supply tank 22 to be thoroughly mixed with the setting solution and conveyed to an outlet channel 26. Pursuant to the present invention, the outlet channel 26 is directly coupled to an extrusion die 28.

As illustrated in FIG. 1, the extrusion die 28 is arranged adjacent to a conveyor 30 so that an extrudate exiting from the extrusion die 30 can be conveyed to other mechanisms for further processing (not shown). A cutting mechanism (not shown) can also be mounted between the extrusion die 28 and conveyor 30 to cut the extrudate as it exits the extrusion die 28, as is generally known in the art.

A fluid inlet port 32 is coupled by a tube 34 to a pump 38, which is, in turn, coupled to a third supply tank 36 via a tube 40. The third supply tank 36 contains a low viscosity fluid that is pumped into the inlet 32 by the pump 38 to facilitate low shear force flow for the extrudate, as will be described below.

As should be understood, the thorough mixing in the mixer 12 of the solution input from the first supply tank 22 and the setting solution input from the second supply tank 24, results in a chemical reaction causing the mixture to gel. Thus, the mixture undergoes a phase transition during conveyance through the extrusion die 28 and prior to egress of the mixture as a gelled extrudate.

To that end, the pumps 18, 20 and the mixer 12 are operated to achieve a speed of conveyance through the mixer 12 and to the extrusion die 28 so that the solutions from the tanks 22, 24 are input to the mixer 12, thoroughly mixed and transported to the extrusion die 28, while the mixture remains in a liquid phase. The pumps 18, 20 and the mixer 12 are also operated to achieve mixing and conveyance of the mixture, which can be in an aqueous slurry phase, under a pressure sufficient to force the mixture into and through the extrusion die 28 for egress of the mixture, as the extrudate from the extrusion die 28. The dimensions of the die 28 can be fixed so that back pressure in the mixer 12 is sufficiently high to prevent the starting of the setting reaction until the mixture flows into the die 28.

Moreover, the extrusion die 28 is configured to have a length sufficient to permit solidification of the mixed components during conveyance through the die so that the extrudate is in a gel state suitable for cutting and processing upon egress from the extension die 28. In addition, the cross-section configuration of the extrusion die 28 is formed to mold the solidifying mixture into a desired shape, as the mixed components or ingredient materials flow through the die.

Figure 2:
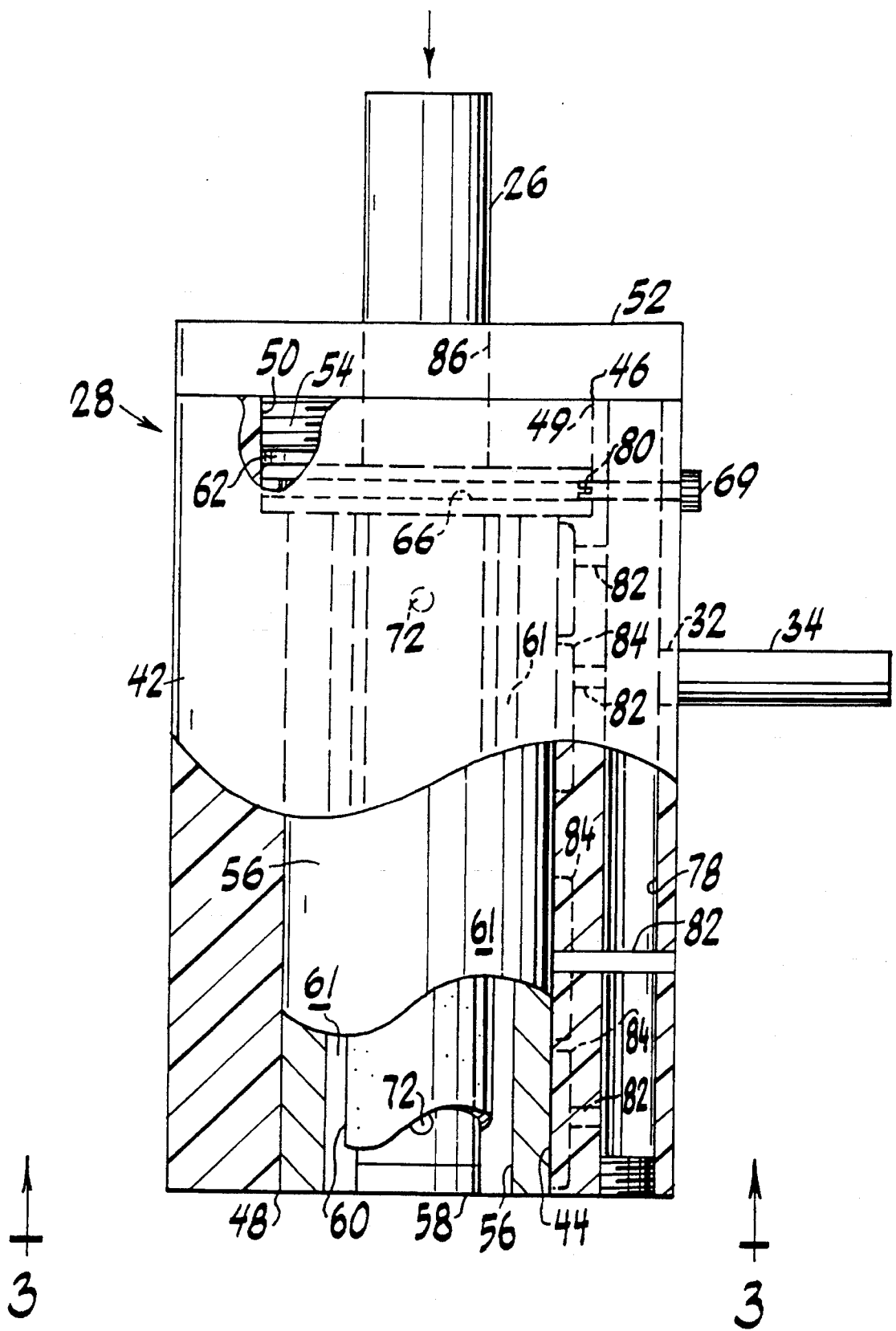
FIG. 2 is a side, partial cross-sectional view of the extrusion die of FIG. 1.

Referring now to FIG. 2, there is illustrated a side, partial cross-sectional view of the extrusion die 28. In the exemplary embodiment of the present invention, the extrusion die 28 comprises a generally cylindrical, plastic die body 42. A longitudinally extending channel 44 is formed throughout the entire length of the die body 42 to provide product ingress and egress openings 46, 48, respectively. The channel 44 includes a portion 49 of expanded diameter at the product ingress end 46 of the die body 42. The internal surfaces 50 of the portion 49 are threaded to secure a cylindrical top cap 52 to the die body 42.

To that end, the top cap 52 includes an axially extending, threaded element 54 removably, and threadedly engaged with the internal surfaces 50 to secure the cap 52 to the die body 42, as illustrated in FIG. 2.

A first cylindrical porous sleeve 56 is received into the channel 44 and extends from the product egress opening 48 of the die body 42 to the lower end of the enlarged portion 49. The porous sleeve 56 can comprise a food grade polyethylene material manufactured by Porex Technologies Corporation, including various pore sizes, as, e.g., 20, 35, 60, 125, 250 or 350 micron pore sizes. In the exemplary embodiment of the present invention, a 20 micron pore size material is used to form the porous sleeve 56.

Figure 3:
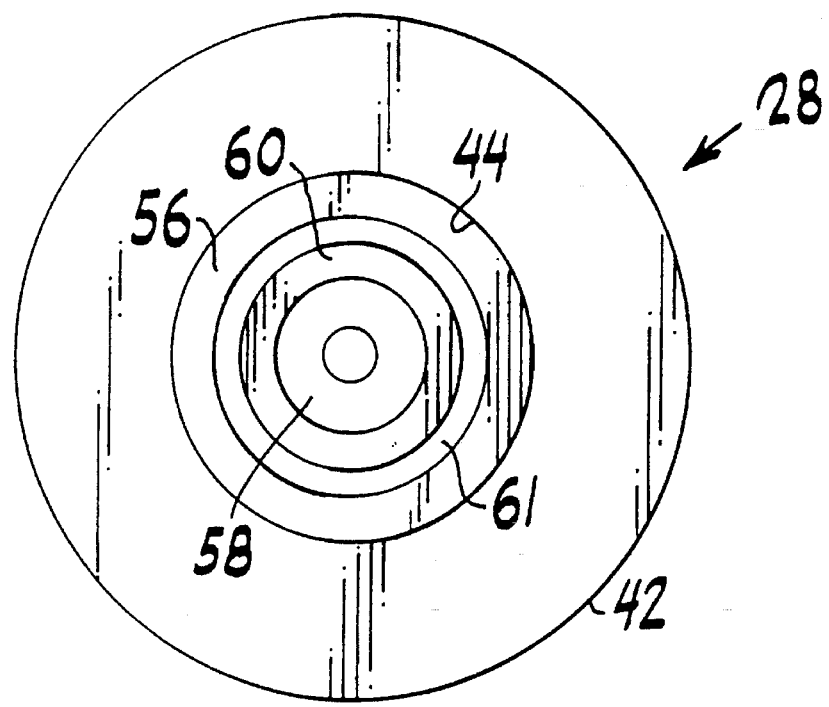
FIG. 3 is an end view of the extrusion die of FIG. 2, taken along line 3—3 of FIG. 2.

Moreover, a plastic spider/mandrel element 58 is arranged to extend within the channel 44 in a co-axial relationship to the porous sleeve 56. The spider/mandrel element 58 mounts a second cylindrical porous sleeve 60, spaced from the first cylindrical porous sleeve 56 and made from a similar material as used to form the first porous cylindrical sleeve 56. The spaced first and second cylindrical porous sleeves 56, 60 define an annular, product flow space 61, extending between the first and second porous sleeves 56, 60 from the enlarged portion 49 to the product egress opening 48 of the die body 42. The annular space 61 is illustrated in FIG. 3.

Figure 4:
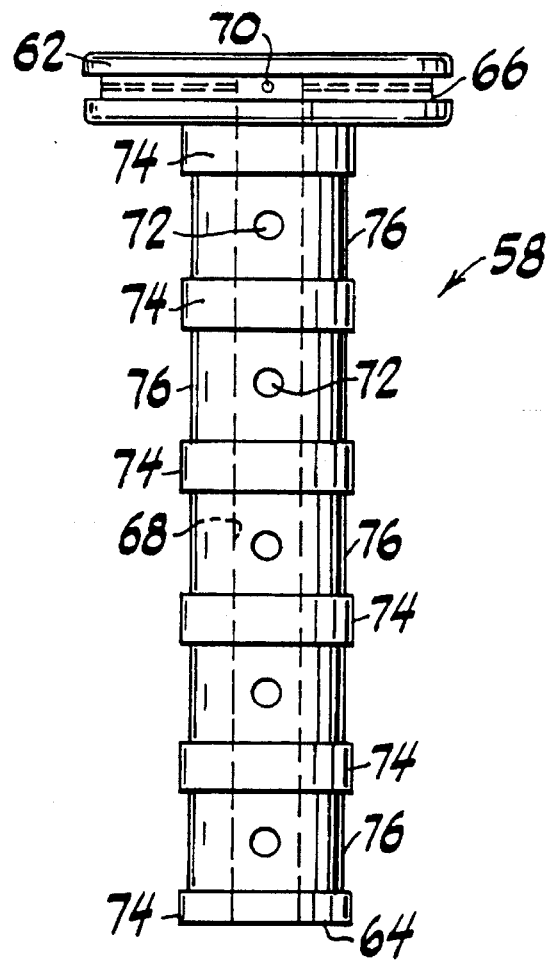
FIG. 4 is a side view of the inside mandrel of the extrusion die of FIG. 2.

A side view of the spider/mandrel element 58 is illustrated in FIG. 4. The element 58 comprises a spider section 62 and an integral mandrel section 64. The spider section 62 is cylindrical in shape and is dimensioned to have a diameter substantially equal to the inner diameter of the enlarged portion 49. The spider section 62 is received within the enlarged portion 49 and rests upon the lower end thereof, as most clearly illustrated, in phantom, in FIG. 2. A circumferentially extending groove 66 is formed in the outer circumference of the spider section 62 and a setting solution channel 68 is formed within the spider/mandrel element 58, extending along the axis of the element 58, from a region axially aligned with the upper end of the circumferentially extending groove 66 to the lowermost end of the mandrel section 64.

Referring briefly to FIG. 2, a plug 69 is received within an opening formed within the die body 42 and is arranged to extend to within the circumferentially extending groove 66 to secure the element 58 within the die body 42.

Figure 5:
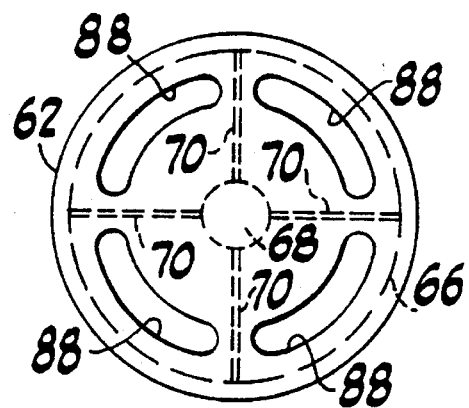
FIG. 5 is a top view of the spider section of the mandrel of FIG. 4.

A series of radially extending fluid flow holes 70 is arranged in the spider section 62 to provide fluid communication between the circumferentially extending groove 66 and the setting solution channel 68 (see FIG. 5). Moreover, a series of openings 72 is formed through the mandrel section 64, with each opening 72 providing fluid communication between the setting solution channel 68 and the outer surface of the mandrel section 64. As clearly illustrated in FIG. 4, the mandrel section 64 includes a plurality of circumferentially extending, raised portions 74 to provide a series of recessed surface areas 76 on the outer surface of the mandrel section 64. As should be understood, the recessed surface areas 76 and second cylindrical porous sleeve 60 define a series of axially spaced, annular shaped reservoirs to receive fluid from the channel 68 via the openings 72.

Referring once again to FIG. 2, a setting solution feed channel 78 is formed within the die body 42 and extends along a direction parallel to each of the first and second cylindrical porous sleeves 56, 60. The channel 78 is connected to the fluid input port 32, which is, in turn, connected to the tube 34, as described above. The channel 78 is utilized to force a low viscosity setting solution under pressure to surfaces of the cylindrical porous sleeves 56, 60, as will appear.

To that end, a fluid flow opening 80 is formed to provide fluid communication between the channel 78 and the circumferentially extending groove 66 so that a setting solution introduced into the channel 78 by the action of the pump 38, via the tube 34 and inlet port 32, flows through the channel 78, into and through the opening 80, around the circumferentially extending groove 66, through the fluid flow holes 70 and into the setting solution channel 68. The pressurized fluid flow continues through the channel 68, through the openings 72 and into the reservoirs defined by the recessed surface areas 76 of the mandrel section 64 and the second cylindrical porous sleeve 60.

The pressurized fluid within the reservoirs continuously seeps through the porous material of the sleeve 60 to form a film of fluid on the surface of the sleeve 60 facing the annular product flow space 61.

In a similar manner, a series of fluid flow openings 82 provide fluid communication between the channel 78 and corresponding ones of a series of cut out sections 84. Each cut out section 84 extends around the entire outer circumference of the first cylindrical porous sleeve 56, with the cut out sections 84 together covering a substantial portion of the outer surface of the sleeve 56. Thus, fluid flow in the channel 78 also flows through the openings 82 and into the sections 84 from which the fluid continuously seeps uniformly through the first cylindrical porous sleeve 56 to form a film of fluid on the surface of the sleeve 56 facing the annular flow space 61.

The top cap 52 includes a product inlet port channel 86 to receive the outlet channel 26 of the mixer 12. The lowermost end of the threaded element 54 is spaced from the top surface of the spider section 62. In this manner, the mixture of materials flows from the outlet channel 26, through the inlet port channel 86 to within the space defined by the threaded element 54 and the top surface of the spider section 62.

Referring to FIG. 5, the top surface of the spider section 62 is formed to include a series of kidney-shaped holes 88, each aligned above the annular space 61 when the spider/mandrel element 58 is mounted within the die body 42. Accordingly, the mixture within the space between the threaded element 54 and the top surface of the spider section 62 flows through the kidney-shaped holes 88, into the annular product flow space 61 and out the egress opening 48. As should be understood, the films of fluid formed on the surfaces of the first and second cylindrical porous sleeves 56, 60 separate the mixture from the surfaces of the extrusion die 28 as the mixture flows through the annular space 61.

Figure 6:
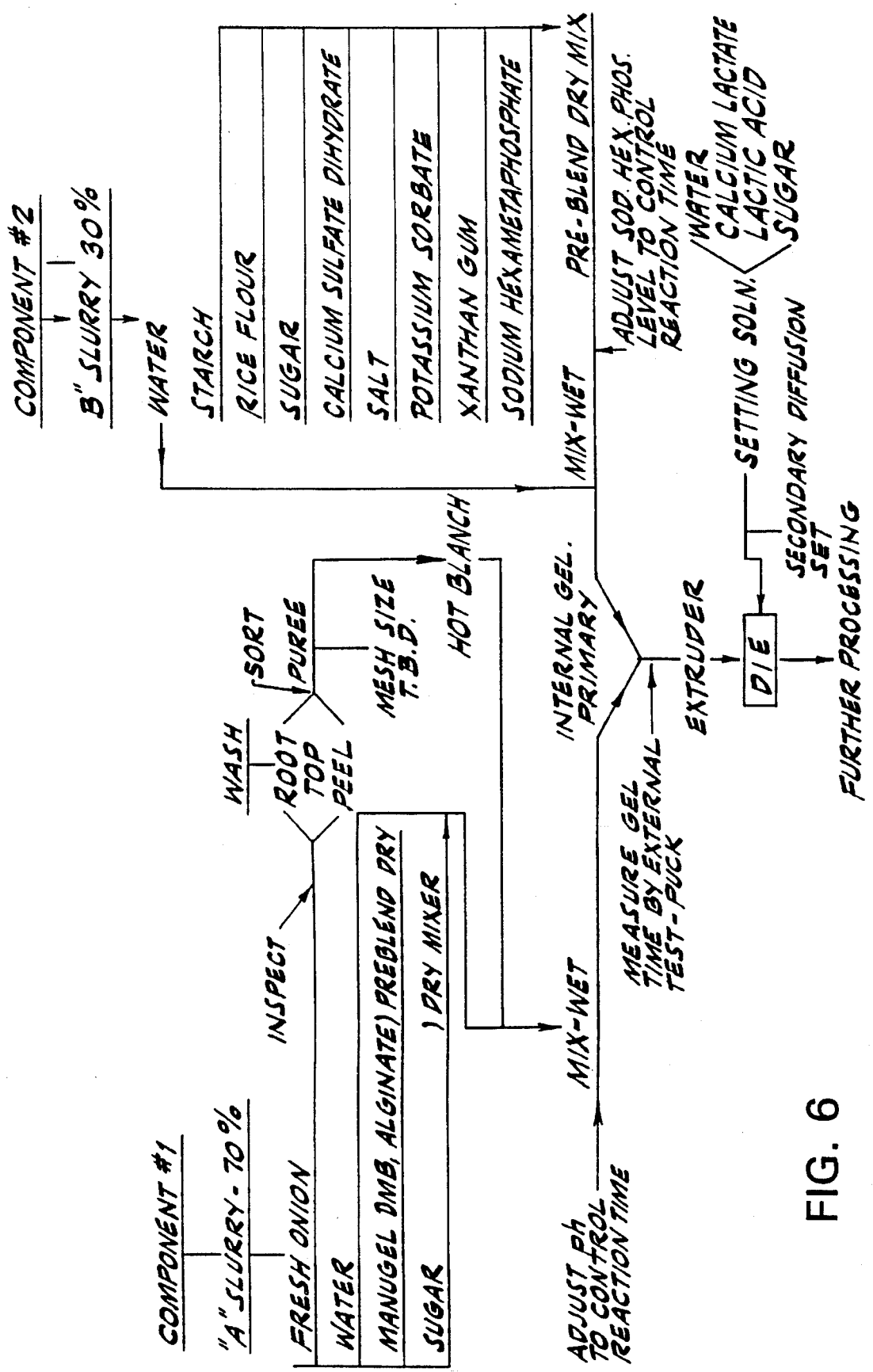
FIG. 6 is a process flow chart of an example of the present invention.

FIG. 6 is a process flow chart of an example of the operation of the above described apparatus utilized to form structured onion rings. To that end, the solution in the first supply tank 22 comprises a fresh onion slurry having the following formulation:

| "A" SLURRY INGREDIENTS | |
|---|---|
| Fresh Onion Puree | 60.00% |
| Water | 6.64% |
| Manugel DMB, Alginate | 1.50% |
| Sugar | 1.86% |
| Subtotal | 70% |

The setting solution contained in the second supply tank 24 comprises a slurry having the following formulation:

| "B" SLURRY INGREDIENTS | |
|---|---|
| Water | 23.55% |
| Starch | 2.00% |
| Rice Flour | 2.00% |
| Sugar | 1.10% |
| Calcium Sulfate Dehydrate | .91% |
| Salt | .25% |
| Potassium Sorbate | .10% |
| Xanthan Gum | .05% |
| Sodium Hexametaphosphate | .04% |
| Subtotal | 30% |

The percentage listed next to each ingredient in the above formulations represents the percentage, by weight, of the corresponding listed ingredient, in the final mixture of the fresh onion slurry and setting solution, upon mixing within the mixer 12. Thus, the subtotals for the "A" and "B" slurries represent the percentage by weight of each slurry in the final mixture.

As illustrated in the process flow chart of FIG. 6, fresh onion is inspected, washed, peeled, pureed and hot blanched. A pre-blended dry mixture of sodium alginate and sugar is mixed with water and then mixed with the fresh onion puree, in the percentages by weight indicated above, to form a wet mixture fed into the inlet port 14 by the pump 18. As indicated in FIG. 6, the pH level of the fresh onion wet mixture can be adjusted empirically so as to control the setting reaction time. Lactic acid can be used as an additive to vary the pH level of the "A" slurry.

The "B" slurry comprises a wet mixture formed by mixing water with a pre-blended dry mix consisting of starch, rice flour, sugar, salt, calcium sulfate dihydrate, sodium hexamethaphosphate, keltrol BT and potassium sorbate, in the percentages by weight indicated above. The setting reaction time can also be controlled by empirically adjusting the level of sodium hexamethaphosphate in the pre-blended dry mix.

As described above, the reaction time and fluid flow rates of the pumps 18, 20 are adjusted to achieve a thorough mixing of the "A" and "B" slurries in the mixer 12 without the setting reaction causing the mixed slurries to gel until the product flow enters the extrusion die 28. Gelling occurs through the occurrence of primary internal chemical reactions including reactions between calcium ions provided by the calcium sulfate dihydrate, and sodium alginate to form calcium alginate gel.

As illustrated in FIG. 6, the "A" and "B" slurries are input to the extruder (mixer 12) and flow from the extruder, after mixing, into the extrusion die 28. The low viscosity setting solution fed under pressure into the inlet port 32 comprises a solution of water, calcium lactate, lactic acid and sugar to form a thin liquid film on the surfaces of the cylindrical porous sleeves 56, 60, as described above. In addition, the calcium lactate provides an additional source of calcium ions that penetrate the mixture of the "A" and "B" slurries, by diffusion from the film. Of course, as described above, the film also provides a two phase, nearly shear stress free movement of the solidifying mixture of the slurries as it flows through the extrusion die 28 to the egress end 48 of the die body 42.

What is claimed is:

1. A method for conveying a product, comprising the steps of providing a flow channel having internal surfaces;

introducing the product into the channel and causing the product to move through the channel for flow as a first phase through the channel; and simultaneously applying a film of fluid over the internal surfaces to provide a second phase to surround the first phase and separate the first phase from the internal surfaces during conveyance of the product through the channel, wherein the product comprises a mixture of chemically reacting components, the chemical reaction causing the mixture to gel during conveyance as the first phase prior to egress from the channel and wherein conveyance of the gel through the channel is effected without encountering degrading shear forces that cause loss of integrity of the gel.

2. The method of claim 1, wherein the step of simultaneously applying a film of fluid is carried out by forming the internal surfaces from a porous material; and causing the fluid to flow uniformly through the porous material to the internal surfaces of the flow channel.

3. The method of claim 1, wherein the product has a first viscosity and the fluid has a second viscosity lower than the first viscosity to provide a low viscosity second phase surrounding the first phase and separating the first phase from the internal surfaces.

4. The method of claim 1, wherein the fluid reacts chemically with the product.

5. A method for continuously forming a product, comprising the steps of:

mixing at least two components to form a mixture;

providing a flow channel having internal surfaces;

introducing the mixture of at least two components into the channel and causing the mixture to move through the channel for flow as a first phase through the channel;

simultaneously applying a film of fluid over the internal surfaces to provide a second phase to surround the first phase and separate the first phase from the internal surfaces during conveyance of the mixture through the channel; and causing the at least two components to react chemically with one another, resulting in a transition of the mixture from a fluid state to a gel, the transition occurring substantially after the step of introducing the mixture into the channel so that the gel is surrounded by the film and separated from the internal surfaces, wherein conveyance of the gel through the channel is effected without encountering degrading shear forces that cause loss of integrity of the gel.

6. The method of claim 5, wherein the step of simultaneously applying a film of fluid is carried out by forming the internal surfaces from a porous material; and causing the fluid to flow uniformly through the porous material to the internal surfaces of the flow channel.

7. The method of claim 5, wherein the components of the mixture include an alginate and a source of calcium to form an alginate gel during movement through the flow channel.

8. A method for continuously forming a product, comprising the steps of:

providing a flow channel having internal surfaces;

introducing the product into the channel and causing the product to move through the channel for flow as a first phase through the channel;

simultaneously applying a film of fluid over the internal surfaces to provide a second phase to surround the first phase and separate the first phase from the internal surfaces during conveyance of the product through the channel; and causing the film of fluid to react chemically with the product at the interface between the first phase and the second phase during conveyance of the product through the channel, wherein the product comprises a mixture of chemically reacting components, the chemical reaction causing the mixture to gel during conveyance as the first phase prior to egress from the channel and wherein conveyance of the gel through the channel is effected without encountering degrading shear forces that cause loss of integrity of the gel.

9. The method of claim 8, wherein the step of simultaneously applying a film of fluid is carried out by forming the internal surfaces from a porous material; and causing the fluid to flow uniformly through the porous material to the internal surfaces of the flow channel.

10. The method of claim 8, wherein the product comprises a food and the chemical reaction results in a skin structure forming around the food at the interface between the first phase and the second phase.

11. A method for continuously forming a product, comprising the steps of:

mixing at least two components to form a mixture;

providing a flow channel having internal surfaces;

introducing the mixture of at least two components into the channel and causing the mixture to move through the channel for flow as a first phase through the channel;

simultaneously applying a film of fluid over the internal surfaces to provide a second phase to surround the first phase and separate the first phase from the internal surfaces during conveyance of the mixture through the channel, wherein the at least two components chemically react so as to cause the mixture to gel during conveyance as the first phase prior to egress from the channel and wherein conveyance of the gel through the channel is effected without encountering degrading shear forces that cause loss of integrity of the gel.

12. The method of claim 11 wherein the at least two components comprise an alginate and a source of calcium to form an alginate gel during the step of causing the mixture to move through the channel for flow as a first phase through the channel.

13. The method of claim 11 wherein the at least two ingredients react chemically with one another.

14. A method for conveying a product, comprising the steps of providing a flow channel having internal surfaces;

introducing the product into the channel and causing the product to move through the channel for flow as a first phase through the channel; and simultaneously applying a film of fluid over the internal surfaces to provide a second phase to surround the first phase and separate the first phase from the internal surfaces to thereby cause the first phase to move as a plug of material during conveyance of the product through the channel, wherein the product comprises a mixture of chemically reacting components, the chemical reaction causing the mixture to gel during conveyance as the first phase prior to egress from the channel and wherein conveyance of the gel through the channel is effected without encountering degrading shear forces that cause loss of integrity of the gel.

15. A method for continuously forming a product, comprising the steps of:

providing a mixing chamber;

using the mixing chamber to mix at least two components to form a mixture;

providing a flow channel having internal surfaces;

coupling the mixing chamber to the flow channel;

causing the mixture to move from the mixing chamber to the flow channel for flow as a first phase through the channel under conditions resulting in a back pressure in the mixing chamber;

simultaneously applying a film of fluid over the internal surfaces to provide a second phase to surround the first phase and separate the first phase from the internal surfaces during conveyance of the mixture through the channel; and causing the at least two components to react chemically with one another, resulting in a transition of the mixture from a fluid state to a gel, the back pressure preventing the transition of the mixture from a fluid state to a gel until the mixture flows into the channel so that the gel is surrounded by the film and separated from the internal surfaces, wherein conveyance of the gel through the channel is effected without encountering degrading shear forces that cause loss of integrity of the gel.

16. A method for continuously forming a product, comprising the steps of:

providing a flow channel having internal surfaces;

introducing the product into the channel and causing the product to move through the channel for flow as a first phase through the channel;

simultaneously applying a film of fluid over the internal surfaces to provide a second phase to surround the first phase and separate the first phase from the internal surfaces during conveyance of the product through the channel; and causing the film of fluid to react chemically with the product at the interface between the first phase and the second phase to form a skin surface surrounding the first phase at the interface with the second phase during conveyance of the product through the channel, wherein the product comprises a mixture of chemically reacting components, the chemical reaction causing the mixture to gel during conveyance as the first phase prior to egress from the channel and wherein conveyance of the gel through the channel is effected without encountering degrading shear forces that cause loss of integrity of the gel.

17. A method for continuously forming a product, comprising the steps of:

mixing at least two components to form a mixture;

providing a flow channel having internal surfaces;

introducing the mixture of at least two components into the channel and causing the mixture to move through the channel for flow as a first phase through the channel;

simultaneously applying a film of fluid over the internal surfaces to provide a second phase to surround the first phase and separate the first phase from the internal surfaces during conveyance of the mixture through the channel;

causing the film of fluid to react chemically with the mixture at the interface between the first phase and the second phase to form a skin structure around the mixture to contain the mixture as a plug of material during conveyance of the product through the channel, wherein the at least two components chemically react so as to cause the mixture to gel during conveyance as the first phase prior to egress from the channel and wherein conveyance of the gel through the channel is effected without encountering degrading shear forces that cause loss of integrity of the gel.

18. A method for forming a gelled product comprising:

preparing a liquid mixture of at least two components capable of chemically reacting to form a gel;

causing the liquid mixture to flow into a channel, and allowing the liquid mixture to form a gelled product in the channel during conveyance of the liquid mixture through the channel, while simultaneously applying a film of fluid over the internal surfaces of the channel to surround the liquid mixture and separate the liquid mixture from the internal surfaces of the channel during conveyance of the mixture through the channel;

wherein the flow of the liquid mixture into the channel causes the gelled product to be extruded from the channel to form a gelled extrudate having a preselected shape.

19. The method according to claim 18 wherein the gelled extrudate is formed without break up and without loss of integrity of the gel.

20. The method according to claim 18 wherein the liquid mixture flows as a first phase into the channel, wherein the channel includes internal surfaces and wherein the method includes the step of simultaneously applying a film of fluid over the internal surfaces to provide a second phase to surround the first phase and separate the first phase from the internal surfaces during conveyance of the product through the channel.

21. The method according to claim 18 wherein the gelled extrudate comprises pureed onion.

22. The method according to claim 21 wherein the gelled extrudate is in the shape of an onion ring.

23. A food product obtained by a process comprising the steps of:

preparing a liquid mixture of at least two components capable of chemically reacting to form a gel;

causing the liquid mixture to flow into a channel; and allowing the liquid mixture to form a gelled product in the channel during conveyance of the liquid mixture through the channel, while simultaneously applying a film of fluid over the internal surfaces of the channel to surround the liquid mixture and separate the liquid mixture from the internal surfaces of the channel during conveyance of the mixture through the channel;

wherein the flow of the liquid mixture into the channel causes the gelled product to be extruded from the channel to form a gelled extrudate having a preselected shape, wherein conveyance of the gelled product through the channel is effected without encountering degrading shear forces that cause loss of integrity of the gel or physical break up of the gelled extrudate and wherein the gelled extrudate comprises pureed onion.

24. The food product of claim 23 wherein the gelled extrudate is formed without break up and without loss of integrity of the gel.

25. The food product of claim 23 wherein the liquid mixture flows as a first phase into the channel, wherein the channel includes internal surfaces and wherein the method includes the step of simultaneously applying a film of fluid over the internal surfaces to provide a second phase to surround the first phase and separate the first phase from the internal surfaces during conveyance of the product through the channel.

26. The food product of claim 23 wherein the gelled extrudate is in the shape of an onion ring.

27. The food product of claim 23 wherein the at least two components of the liquid mixture include an alginate and a source of calcium to form an alginate gel during conveyance of the mixture through the channel.

* * * * *